United States Patent [19]

Blonde

[11] 3,855,712

[45] Dec. 24, 1974

[54] METHOD OF PREPARATION OF PHARMACEUTICAL PRODUCTS

[75] Inventor: Pierre Blonde, Saint Maur Des Fosses, France

[73] Assignee: Societe Anonyme dite: Orsymonde, Paris, France

[22] Filed: Apr. 2, 1974

[21] Appl. No.: 457,244

[30] Foreign Application Priority Data
Apr. 3, 1973  Great Britain .................. 15914/73

[52] U.S. Cl. .......................................... 34/5, 34/92
[51] Int. Cl. ............................................. F26b 5/06
[58] Field of Search ..................................... 34/5, 92

[56] References Cited
UNITED STATES PATENTS
3,397,462  8/1968  Jellicich .............................. 34/5 X
R27,583  2/1973  Charler-Vadrot .................... 34/5 X

*Primary Examiner*—John J. Camby

[57] ABSTRACT

The use of organic solvents having an evaporation rate, as compared with ether, of not more than 50 times has been formed to afford considerable handling and production advantages in the preparation of pharmaceutical products made from lyophilised pharmaceutical compositions and water-soluble or water-dispersible polymeric binders; the products are made by forming a paste from the pharmaceutical compositions, the polymeric binder and the organic solvent, solidifying the paste at a temperature of −15° to −50°C. and then lyophilising the frozen material under vacuum. This technique is especially desirable as it enables lyophilised products to be made which contain a water-activated effervescent couple.

17 Claims, No Drawings

METHOD OF PREPARATION OF PHARMACEUTICAL PRODUCTS

FIELD OF THE INVENTION

The present invention relates to a process for the preparation of pharmaceutical products which have been dehydrated or desolvated by lyophilisation; the invention is concerned especially with such products as are capable either of resuming their original form by the limited addition of water or of rapidly and integrally dispersing or dissolving in water.

BACKGROUND OF THE INVENTION

Up till now, pharmaceutical products of the aforementioned kind have been made by lyophilisation of an aqueous solution or an aqueous paste of the pharmaceutically-active material, in admixture with the usual lyophilisation additives. For this purpose, the solution or paste is frozen in lyophilisation vats or trays at a temperature of −18° to −40°C (i.e., in the range from 0°F to −40°F) and then the frozen material is lyophilised under a high vacuum of about $10^{-2}$ mm Hg to initiate removal of the water by sublimation. This technique can be used to make the desired products, though it is relatively complex and therefore difficult to carry out and also it has the disadvantage of requiring considerable amounts of energy.

SUMMARY OF THE INVENTION

It is an object of the invention to provide an improved technique for use in the manufacture of dehydrated or desolvated pharmaceutical products.

Another object of the invention is to provide an improved method of preparation of such products which incorporates the use of a class of organic solvents having evaporation rates related to that of ether.

A further object of the invention is to provide for the preparation of pharmaceutical products so that less energy need be consumed and other valuable savings in materials and/or operative costs can be achieved.

An additional object of the invention is to enable pharmaceutical products which have been dehydrated or desolvated by lyophilisation to be made by a simple technique which can be used both in the manufacture of simple, i.e., non-effervescent products and also in the manufacture of produ-ts which include an effervescent couple or other effervescent reactants and thus exhibit an advantageous effervescent action when contacted with water in use.

DESCRIPTION OF THE PREFERRED EMBODIMENTS

The objects set forth above have been found to be attained by the process of the present invention, wherein the active pharmaceutical material is mixed in the dry state with a polymeric binder material soluble in water or capable of producing colloidal solutions in water and, if required, with the usual additives for lyophilisation and the mixture obtained is made into a paste under normal conditions of temperature and pressure, with the aid of a solvent for the binder selected from readily evaporable organic solvents, that is to say those having a rate of evaporation less than 50 times and preferably less than or equal to 10 times that of sulphuric ether, the paste obtained is frozen, if required after being placed in moulds, at a temperature of −15° to −30°C (i.e., 5°F to −22°F) and then the frozen material is lyophilised under vacuum.

The rate of evaporation of ether taken as a unit of measurement is given by the time which is required for 0.5 cm³ of ether poured on to a filter paper no longer to give a visible mark.

Readily evaporable organic solvents corresponding to this criterion include the following:

| | |
|---|---|
| dioxane | cyclohexane |
| carbon tetrachloride | dimethylamine |
| chloroform | dimethylsulphoxide |
| benzene | tertiary butyl alcohol. |

One useful empirical method of quantifying evaporation rates is to select the base 1 as the rate of evaporation of ether; on this basis, that of dioxane is 7.3, that of carbon tetrachloride is 4, that of chloroform is 2.5 and that of benzene is 3.

The use of organic solvents in place of water has a number of advantages.

1. In general, from an economic standpoint, freezing and lyophilisation of organic liquids requires much less energy than the lyophilisation of water.
2. With particular relation of lyophilised products, the use of organic solvents considerably simplifies the manufacturing technique.

As regards effervescent products, the effervescence is produced at the moment of use by reaction in the presence of water of an organic acid (e.g., citric acid, tartaric acid, ascorbic acid and so on) and a member of the group consisting of alkali metal and alkaline earth metal carbonates and bicarbonates, with the evolution of carbon dioxide.

It is thus extremely difficult to manufacture lyophilised effervescent products, when preparation of the paste intended to be lyophilised is carried out using water.

As the reaction between the acid and the bicarbonate or carbonate must not take place during the preparation, it is necessary to operate at very low temperatures and to prepare and freeze two pastes separately, namely:

an acid paste, and an alkaline paste, which can only be admixed without inconvenience in the form of solidifed particles when maintained at temperatures below −20°C (−4°F).

In contrast, the reaction between the organic acid and the alkali metal or alkaline earth metal carbonate or bicarbonate does not take place in organic solvents. The use of such liquids to prepare the initial paste for effervescent products thus makes it possible to operate with a single homogeneous paste and under normal conditions of temperature.

However, the use of organic solvents in the manufacture of pharmaceutical products, whether or not they are effervescent, according to the invention, raises a problem with the binders. In the aqueous phase, most colloids, high molecular weight polysaccharides and soluble polymers are capable of serving as binders. The choice is more limited in the organic phase, because these additional substances, which are intended to increase the mechanical resistance, must be soluble both in the organic solvent utilised during manufacture and also in water at the time of use. Only polymeric binders which are soluble in water or are capable of giving colloidal solutions in water, which are also soluble in readily evaporable organic solvents, can be used. Mention may be made for this purpose of the following binders:

polyvinylpyrrolidone,
copolymers of polyvinylpyrrolidone and polyvinyl alcohols,
polyvinyl alcohols,
carboxypolymethylenes,
polyethyleneglycols,
copolymers of maleic anhydride and polyvinylmethylether,
copolymers of polyethylene and maleic anhydride etc.

The binder can be employed in an amount which can be 10 percent by weight with respect to the dry mixture.

As the usual lyophilisation additives, use can be made of ingestible fillers which are soluble in water, such as lactose, saccharose, glucose, xylose, levulose, glycocol, sorbitol, mannitol and starch gellified to a greater or lesser extent. Sweeteners, aromatising compounds and colouring agents can also be added.

One of the principal advantages of the use of organic solvents in place of water in the manufacture of desolvated pharmaceutical products by lyophilisation resides in the fact that the same process can be used for the simple products and for the effervescent products.

According to a particular embodiment of the invention, a dry mixture is prepared by combining the pharmaceutical composition with a polymeric binder and, if required, the usual lyophilisation additives, the dry mixture is rendered into a paste with the organic solvent, the paste obtained is frozen, placed into moulds and the frozen material is then lyophilised.

According to a variant of this procedure, a dry mixture is prepared from the pharmaceutical composition, the usual lyophilisation additives if required and a part of the binder, if required. A solution of 0.1–10 percent by weight of the binder or the rest of the binder in the organic solvent is separately prepared. The solution is then added to the dry mixture to form a paste in the proportion of 5 percent to 75 percent of solvent with respect to the total weight of the dry mixture; the paste is then uniformly mixed, put into moulds if required and the paste obtained is then frozen, the frozen material then being lyophilised under vacuum.

EXAMPLES

The invention is illustrated by the non-limitative examples which follow. In these examples, the general mode of operation utilised is as follows:

1. in the dry state, all the pulverulent constituents of the formulation are mixed together, except for all or part of the binder;
2. the binder or the remainder of the binder is dissolved in the organic solvent to obtain a solution having a concentration which can range from 0.1 percent to 10 percent by weight;
3. a sufficient quantity of this solution is then added to the mixture of the pulverulent constituents to obtain a paste of suitable consistency; depending upon the nature and particle size range of the pulverulent constituents, the quantity of organic solution to be used can range 5 percent to 75 percent with respect to the total weight of the pulverulent constituents;
4. after homogeneous mixing of the paste, it is placed in moulds of appropriate shape and size;
5. the mixture is frozen at a temperature of −15° to −50°C (5°F to −58°F) and then lyophilised (freeze-dried) under vacuum which, depending upon the organic phase, can be much less than that necessary for the sublimation of frozen water.

Another important advantage of the use of an organic solvent also resides in these conditions of lyophilisation. It is not necessary, in order to proceed with this operation, to use an improved apparatus of the kind which is essential for classical lyophilisation of an aqueous phase. The heating requirements and the vacuum can be less and the output of energy is also lower. Also, the organic phase sublimed can be condensed in a vapour trap and this liquid can be recovered, thus reducing the manufacturing costs by recycling it for further preparations.

A further advantage of the use of an organic solvent resides in the improvement in solubility and consequently the physiological activity of certain active principles which are less spontaneously soluble in an aqueous phase.

If the active principles can be dissolved in the organic solvent, they are found after lyophilisation homogeneously distributed throughout the mass in an extremely finely subdivided form, which is favourable to their dissolution in the water used at the time of use.

EXAMPLE 1

Effervescent lyophilised preparations
Composition

| Medicament: | No 1 | No 2 |
| --- | --- | --- |
| extract of Butcher's Broom | 12.6 g | 12.6 g |
| methyl esculetol | 0.4 g | 0.4 g |
| methylchalcone hesperedin | 3.3 g | 3.3 g |
| Effervescent mixture: | | |
| sodium bicarbonate | 16.0 g | 16.0 g |
| citric acid | — | 4.0 g |
| ascorbic acid | 16.0 g | 16.0 g |
| Lyophilisation additive: | | |
| sodium saccharinate | 0.08 g | 0.08 g |
| lactose | 26.0 g | 26.0 g |
| saccharose | 28.0 g | 28.0 g |
| Binder: | | |
| polyvinylpyrrolidone | 2.0 g | 2.0 g |
| Solvent: | | |
| tertiary butanol | 20 ml | 25 ml |

The pharmaceutical constituents are mixed in the dry state with the components of the effervescent mixture and the lyophilisation additives. Then the polyvinylpyrrolidone is dissolved in the tertiary butanol and, with the solution obtained, the dry mixture prepared previously is made into a paste. After homogeneous mixing of the paste, it is divided into parallelepiped lyophilisation trays 5 cm × 5 cm × 3 cm and subjected to lyophilisation.

The conditions of temperature and pressure used during the lyophilisation are given in Tables I and II below.

After lyophilisation, the trays are weighed at frequent intervals during the first six hours and the humidity take-up is measured and expressed as milligrams of water taken up per tray contents.

The measurements of mechanical resistance of the lyophilisates have been made with a needle penetrometer. An increasing force is applied to the sample, the hardness of which is to be measured, over a constant surface area and measurement is made of the force necessary for rupture or penetration of the needle. For the lyophilisates described above, the relative hardnesses and the characteristics of humidity take-up are satisfactory.

The preparation proceeded as in Example 1 by making a paste of the dry medicament mixture, the effervescent mixture and the lyophilisation additives with the aid of a solution of the binder in the organic solvent and then effecting lyophilisation of the resultant paste, after putting it into trays, under the conditions indicated in Example 1. The characteristics of humidity take-up and mechanical solidity of the lyophilisates obtained are comparable to those of Example 1.

TABLE I.—CONDITIONS OF LYOPHILISATION OF COMPOSITION NO. 1

| Time (hrs.) | 0 | 2 | 4 | 5 | 6 | 8 | 9 | 10 | 12 | 14 | 16 | 18 | 22 | 23 |
|---|---|---|---|---|---|---|---|---|---|---|---|---|---|---|
| Pressure (mm. Hg) | 760 | 760 | $3\text{-}10^{-1}$ | $2\text{-}10^{-1}$ | $1.3\text{-}10^{-1}$ | $1.3\text{-}10^{-1}$ | $1.3\text{-}10^{-1}$ | $1.3\text{-}10^{-1}$ | $10^{-1}$ | $10^{-1}$ | $10^{-1}$ | $10^{-2}$ | $10^{-2}$ | 760 |
| Temperature: | | | | | | | | | | | | | | |
| °C | +22 | −50 | −40 | −42 | −20 | −25 | 0 | +5 | +10 | +15 | +15 | +15 | +30 | +30 |
| °F | 72 | −58 | −40 | −44 | −4 | −13 | 32 | 41 | 50 | 59 | 59 | 59 | 86 | 86 |

TABLE II

Conditions of Lyophilisation of Composition No 2

| Time (hrs) | 0 | 3 | 10 | 20 | 25 | 28 |
|---|---|---|---|---|---|---|
| Pressure (mm Hg) | 760 | 25 | 25 | 25 | 25 | 25 |
| Temperature | | | | | | |
| °C | +22° | −45° | −10° | −10° | −3° | +22° |
| °F | 72° | −49° | 14° | 14° | 26° | 72° |

The lyophilisation has been conducted under conditions of vacuum and temperature which are clearly less vigorous and clearly less onerous than those utilised for composition No. 1. After freezing for three hours, the vacuum was fixed at 25 mm Hg and the temperature of the plates was fixed at a value such that the medium remains at −10°C. The sublimation required several hours.

EXAMPLE 2

Effervescent lyophilised preparations containing various binders and solvents

| Composition | | | |
|---|---|---|---|
| Medicament: | No 3 | No 4 | No 5 |
| magnesium aspartate | 11.8g | 11.8g | 11.8g |
| arginine base | 11.3g | 11.3g | 11.3g |
| Effervescent mixtures: | | | |
| citric acid | 18.0g | 18.0g | — |
| sodium bicarbonate | 16.0g | 10.0g | — |
| lithium carbonate | — | — | 32.0g |
| potassium hydrogen tartrate | — | — | 18.0g |
| Lyophilisation additive: | | | |
| lactose | 26.0g | 28.0g | 28.0g |
| saccharose | 28.0g | — | 30.0g |
| sodium saccharinate | 0.01g | — | 0.01g |
| Binder: | | | |
| polyethyleneglycol 6000 | 2.0g | — | — |
| polyvinylpyrrolidone | — | 6.0g | — |
| RC 102 (block polymer of ethylene oxide and propylene oxide) | — | — | 3.0g |
| Solvent: | | | |
| tertiary butanol | 20 ml | 25 ml | — |
| dioxane | — | — | 30 ml |

EXAMPLE 3

This Example relates to an effervescent lyophilised preparation not containing any lyophilisation additive.

Composition No. 6

| | |
|---|---|
| citric acid | 11.9 g |
| monopotassium citrate | 17.2 g |
| monosodium citrate | 18.4 g |
| sodium bicarbonate | 12.0 g |
| 2% solution of polyvinylpyrrolidone in tertiary butyl alcohol | 35 ml |

The procedure was described in Example 1 for obtaining this effervescent lyophilised preparation. The characteristics of humidity take-up and mechanical solidity of the lyophilisate obtained are satisfactory. In this example, the citric acid and the citrates serve both as a medicament and also as constituents of the effervescent mixture.

EXAMPLE 4

This Example illustrates the case of a non-effervescent lyophilised preparation not containing a lyophilisation additive.

Composition No 7

| | |
|---|---|
| citric acid | 11.9 g |
| monopotassium citrate | 17.2 g |
| monosodium citrate | 18.4 g |
| sodium bicarbonate | 12.0 g |
| 2% solution of polyvinylpyrrolidone in tertiary butyl alcohol | 30 ml |

The procedure of Example 1 was used to obtain this lyophilised preparation. The characteristics of humidity take-up and mechanical solidity of the lyophilisate obtained are satisfactory.

Although the present invention has been described with detailed reference to specific embodiments thereof, it is not intended to be so limited, since modifications and alterations may be made therein which are within the complete intended scope of the invention as defined in the appended claims.

I claim:

1. A process of preparation of a dehydrated or desolvated pharmaceutical product by lyophilisation, which comprises the steps of:
   i. combining with a pharmaceutical composition to be lyophilised
      a. a polymeric binder selected from the group consisting of polymeric compounds which are soluble in water and polymeric compounds capable of giving colloidal solutions in water; and
      b. an organic solvent for the binder having a speed of evaporation less than 50 times that of ether;
   ii. solidifying the paste so obtained at a temperature in the range of $-15°$ to $-50°C$; and
   iii. subjecting the resultant frozen material to a process of lyophilisation under vacuum.

2. The process of claim 1, in which the organic solvent has a speed of evaporation less than or equal to 10 times that of ether.

3. The process of claim 1, in which the organic solvent is selected from the group consisting of dioxane, carbon tetrachloride, chloroform, benzene, cyclohexane, dimethylamine, dimethylsulphoxide, tertiary butanol and diethylaminoethanol.

4. The process of claim 1, in which the polymeric binder is selected from the group consisting of polyvinylpyrrolidone, copolymers of polyvinylpyrrolidone and polyvinyl alcohols, polyvinyl alcohols, carboxypolymethylenes, polyethylene glycols, copolymers of maleic anhydride and polyvinylmethylether, copolymers of polyethylene and maleic anhydride and block copolymers of ethylene oxide and propylene oxide.

5. The process of claim 1, in which at least one lyophilisation additive selected from the group consisting of lactose, saccharose, glucose, xylose, levulose, glycocol, sorbitol, mannitol, starch and sodium saccharinate is included in the composition of step (i).

6. The process of claim 1, in which the organic solvent is employed in a proportion of 5 percent to 75 percent by weight with respect to the dry mixture.

7. The process of claim 1, in which the binder is employed in an amount up to 10 percent by weight with respect to the dry mixture.

8. The process of claim 1, in which a dry mixture is prepared by combining the pharmaceutical composition with the polymeric binder (a) and optionally at least one lyophilisation additive, the dry mixture is rendered into a paste with the organic solvent (b), the paste so obtained is frozen and the frozen material is then lyophilised.

9. The process of claim 8, in which at least one lyophilisation additive in included in the mixture.

10. The process of claim 1, in which a dry mixture is prepared from the pharmaceutical composition and, optionally, either or both of at least one lyophilisation additive and a part of the binder (a), a solution of 0.1 to 10 percent by weight of the binder or the rest of the binder in the organic solvent is separately prepared, the solution is added to the dry mixture to form a paste in the proportion of 5 percent to 75 percent of the solvent with respect to the total weight of the dry mixture, the paste is admixed in a homogenous manner, the paste so obtained is then frozen and the frozen material is lyophilised under vacuum.

11. The process of claim 10, in which at least one lyophilisation additive is included in the mixture.

12. The process of claim 8, in which the pharmaceutical composition contains an effervescent mixture.

13. The process of claim 12, in which the effervescent mixture comprises an organic acid and a weak mineral base.

14. The process of claim 13, in which the organic acid is selected from the group consisting of citric acid, tartaric acid and ascorbic acid and the weak mineral base is selected from the group consisting of the alkali metal and alkaline earth metal carbonates and bicarbonates.

15. The process of claim 1, in which the pharmaceutical composition is combined with polyvinyl pyrrolidone, the resultant dry mixture is made into a paste with tertiary butanol, the paste is frozen and the frozen material is lyophilised.

16. The process of claim 1, in which the pharmaceutical composition is combined with a polymeric binder selected from the group consisting of polyethylene glycols and block polymers of ethylene oxide and propylene oxide, the resultant dry mixture is made into a paste with an organic solvent selected from the group consisting of tertiary butanol and dioxane, the paste is frozen and the frozen material is lyophilised.

17. A process of preparation of a desolvated pharmaceutical product, which comprises the steps of:
   i. combining a pharmaceutical composition with:
      a. polyvinylpyrrolidone;
      b. tertiary butanol;
      c. citric acid;
      d. mono potassium citrate;
      e. mono sodium citrate; and
      f. optionally sodium bicarbonate;
   ii. solidifying the resultant paste at a temperature in the range of $-15°$ to $-50°C$; and
   iii. subjecting the frozen material so obtained to a process of lyophilisation under vacuum.

* * * * *